Patented Sept. 19, 1939

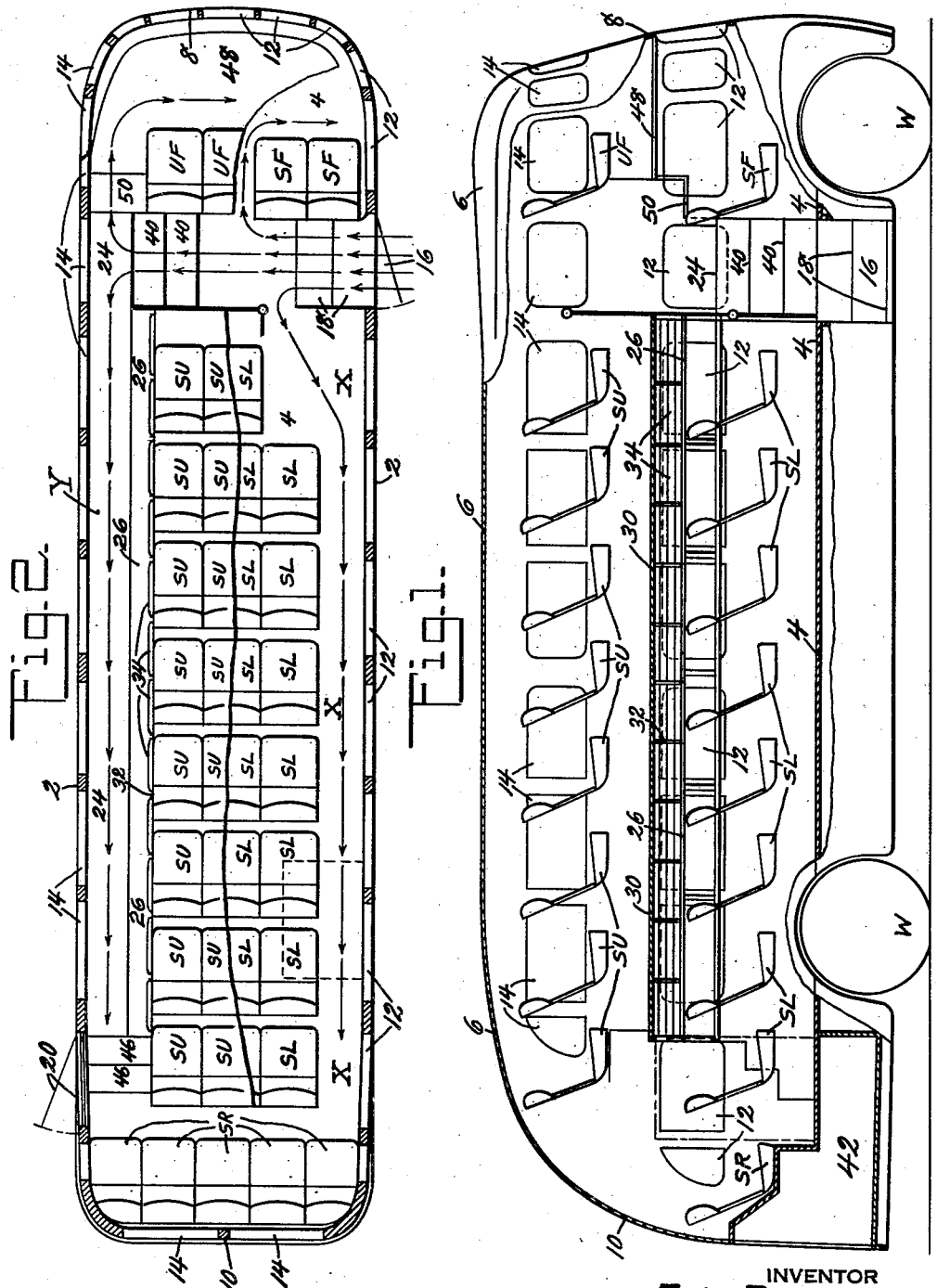

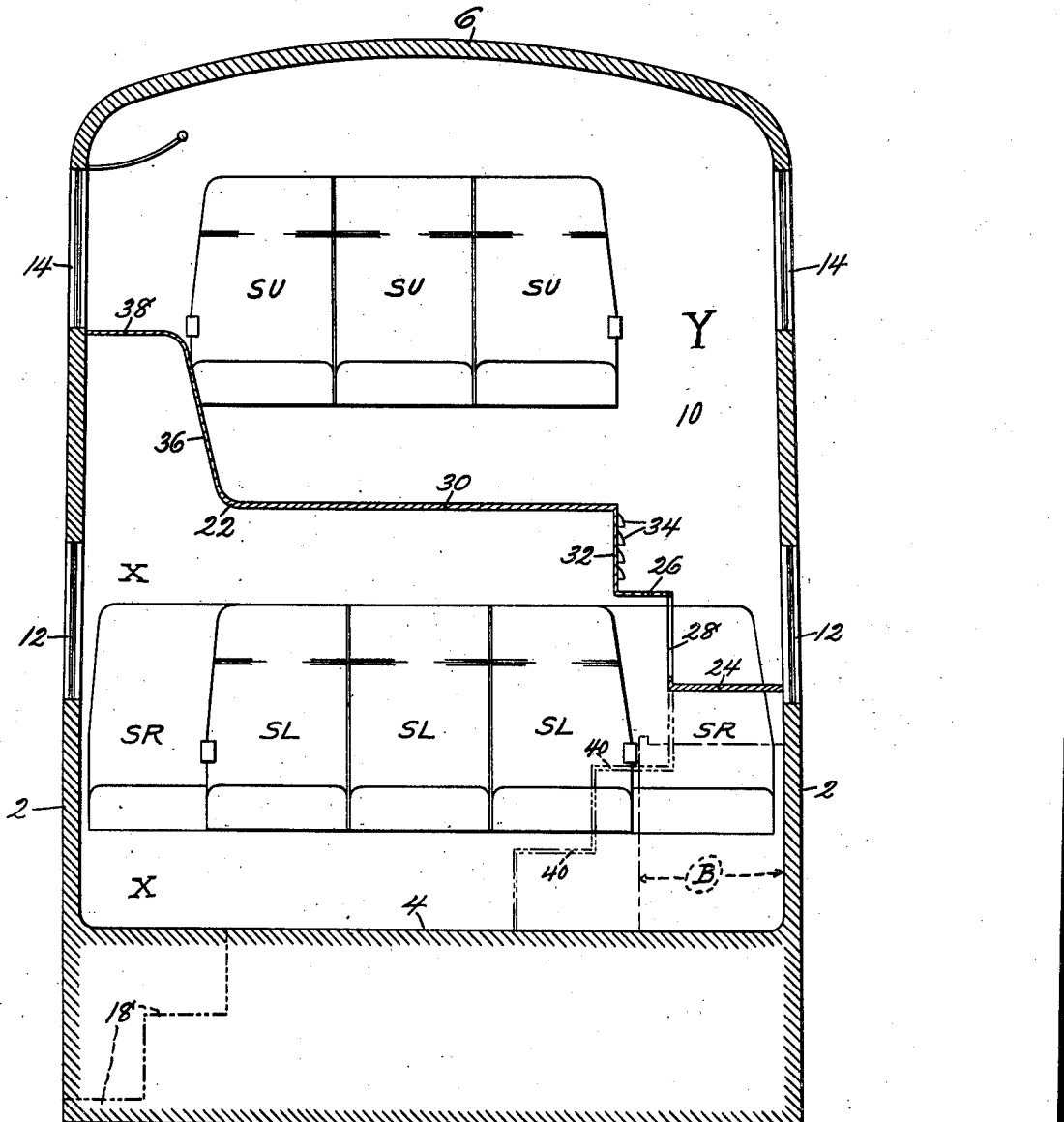

2,173,727

UNITED STATES PATENT OFFICE 2,173,727

DOUBLE-DECK VEHICLE

Eric Ramstrum, Philadelphia, Pa., assignor to American Car and Foundry Motors Company, New York, N. Y., a corporation of Delaware Application February 25, 1939, Serial No. 258,427

9 Claims. (Cl. 296—64)

This invention relates to vehicles in general and in particular to double-deck vehicles of the passenger carrying type.

Double-deck vehicles as constructed in the past have been formed with the aisle space for the upper deck located well above the tops of the seats on the lower deck, thus causing the center of gravity of the empty vehicle to be raised considerably above its location in a conventional single deck vehicle. With the upper deck aisle space raised, the upper deck seats were placed extremely high and in a large number of instances the upper deck seated more passengers than the lower deck, with the result that the center of gravity of the loaded vehicle was extremely high and often resulted in overturning of the vehicle. It is an object therefore, of the present invention to provide a double-deck vehicle in which a large number of passengers may be transported in comfort while maintaining the center of gravity of the loaded vehicle as near the center of gravity of the single deck vehicle as is possible.

A further object of the invention is the provision of a double-deck vehicle having an upper deck located on a plurality of levels, the lower of which is located below the tops of the seats on the lower deck and above a baggage space, thus providing a full height upper deck passageway with a minimum roof height.

A yet further object of the invention is the provision of a double-deck vehicle having a low center of gravity and in which all passengers entering the vehicle must pass by the driver for the collection of fares.

A still further object of the invention is the provision of a double-deck vehicle in which passengers of both the upper and lower decks may escape in emergencies through a rear exit with a minimum of travel through the vehicle.

These and other objects of the invention will be apparent to persons skilled in the art from a study of the following description and accompanying drawings, in which Figure 1 is an elevational view of the bus with part thereof in section to disclose the seating and deck arrangements;

Fig. 2 is a plan view in section showing the seating arrangement of the upper and lower decks and indicating by arrows the direction of passenger travel to reach the seats, and Fig. 3 is a transverse sectional view taken through the vehicle and showing the seating and deck arrangement.

Referring now to the drawings in detail, it will be seen that the vehicle illustrated is of conventional outline as near as it is possible to follow such outline. The vehicle is formed with suitably framed sides 2 joined together adjacent the bottom by lower deck or floor 4 and at the top by roof 6, all of which are connected at the front and rear by walls 8 and 10 respectively. The vehicle is supported on any desired number of wheels W and is preferably driven by means of a prime mover, such as a horizontal engine (not shown), located beneath the floor and between the side wall edges and supporting wheels. The side, front and rear walls are provided with a lower tier of windows 12 having their centers substantially in line with the eye level of passengers seated on the lower deck and with an upper tier of windows 14 located with their centers substantially in alignment with the eye level of passengers seated on the upper deck. The customary entrance and exit to and from the vehicle will be through door 16 which gives admission to the lower deck of the vehicle by way of steps 18. In case of emergency escape from the vehicle may be made through an emergency door 20 located at the rear of the vehicle and diagonally opposite from the customary entrance door 16.

The space between the floor and roof of the vehicle is divided by means of a multi-level deck 22 suitably framed into and supported by the vehicle structure. This multi-level upper deck is formed with a lower level 24 located substantially in alignment with the lower edge of the lower tier of windows 12 and is joined to a higher step ledge 26 by vertically extending wall or post elements 28 located substantially in transverse alignment with the window posts, thus permitting light to enter the lower deck seating space between the lower level 24 and step ledge 26. The step ledge 26 is joined to an intermediate or main upper deck level 30 by means of a wall 32 preferably formed with a plurality of ventilating louvers 34 extending from end to end of the wall 32. The edge of the intermediate or main portion of the upper deck remote from the ventilator wall 32 merges into an upwardly and outwardly directed wall 36 terminating in a horizontally outwardly directed ledge 38 connected to the vehicle side wall adjacent the lower edge of the upper tier of windows on one side of the vehicle. A plurality of forwardly facing seats SL are located on the lower deck of the vehicle immediately below the main or intermediate upper deck portion 30, thus placing the side of one seat adjacent the vertical posts 28 and at such a level that passengers occupying the seats may look through windows 12 on the adjacent side of the vehicle. The lower deck seats in the main portion of the vehicle are spaced from the side wall by placing the last unit substantially in vertical alignment with the inclined wall 36 of the upper deck, thus providing a full height lower deck aisle or passageway X along which passengers may pass to the seats SL below the main portion of the upper deck and also to rear seats SR located on the lower deck along the rear wall of the vehicle. There is also sufficient space on the lower deck for a pair of forward seats SF located ahead of the main entrance and in transverse alignment with the driver's seat located in its usual position on the left side of the vehicle.

Directly ahead of the main entrance and immediately behind the driver's seat steps 46 are provided leading to the lower level 24 of the upper deck. A portion of these steps passes over a baggage space B extending from adjacent the front wheels to the emergency exit and located throughout this area beneath the upper deck lower level and adjacent the left hand seats SL. Admission to this baggage space will be through the customary side doors (not shown). Additional baggage space 42 suitable for trunks or other large, heavy baggage is provided extending transversely of the vehicle beneath the lower deck floor and rear seats and beneath the rear wheels and rear vehicle wall. Admission to this space may be had through either side doors or end doors (not shown). The end of the upper deck lower level 24, remote from the driver, terminates in steps 46, permitting passengers to enter or leave the upper deck and to provide a ready means of exit to the emergency door 20 in case of accident. A plurality of seats SU are mounted upon the main or intermediate upper deck level 30 and directly above the lower seats SL. These upper deck seats may be occupied by passengers entering through full height upper deck passageway Y located between the upper deck seats and the left hand side wall of the vehicle. The main or intermediate upper deck level is extended forwardly past the main entrance passageway to provide a platform 48 which carries a plurality of upper deck seats UF at the front of the vehicle ahead of the main passageway and above the driver's seat and lower front seats SF. Seats UF may be occupied by passengers entering the space by use of step 50, the tread of which is substantially level with the step ledge 26. In this manner it will be seen that full height passageways for both the upper and lower deck passengers have been provided and that passengers are also seated at the front of the vehicle immediately above the driver without restricting the clearances necessary for efficient operation of the vehicle.

From the preceding description it will be seen that passengers entering the vehicle through main entrance 16 will climb steps 18, thus placing them upon the main or lower deck level substantially at the center line of the vehicle and immediately adjacent the driver for collection of fares. If the passengers choose to find seats on the lower level they may walk to the desired seat in comfort through lower deck passageway to any of the seats SL or the rear seats SR. It will be obvious that if after proceeding to the rear of the vehicle seats are not available, then they may climb steps 46 to the upper deck level. In case passengers entering the vehicle should choose to go to the upper deck level, they may climb steps 40 to the upper deck lower level 24 along which they may walk in comfort to their chosen seat. Admission to the upper deck main level and seats SU is readily obtained by provision of the step ledge 26 located intermediate the upper deck main level and the upper deck lower level, which latter forms the floor of the upper deck passageway Y. Passengers may also after climbing the steps 40 turn forwardly and by use of step 50 gain entrance to forward platform 48 and seats UF. The seats SF adjacent the driver are, of course, occupied by passengers walking directly to the same from the lower deck level immediately after entrance into the vehicle. All passengers entering the vehicle, whether they go to the lower deck or upper deck seats, must pass closely adjacent the driver permitting him to check entrance of passengers and receive their tickets or fares. It will be seen that passengers, whether seated on the upper or lower decks, will be enabled to look out of either side of the vehicle in substantially the same manner as they can at present with single level vehicles. By placing the passageways at the sides of the vehicle and in overlapping relation to the seats full height passageways are obtained with a minimum roof height and with the seats being placed closer together vertically than is possible with arrangements heretofore known, such placement of passageways and seats allows a substantial lowering of the center of gravity and will permit of a double deck vehicle being built with an increase of less than three feet in the height of standard single deck vehicles.

While the invention has been described more or less in detail, it is obvious that various modifications and rearrangements of parts will be suggested to persons skilled in the art and all such modifications and rearrangements of parts are contemplated as will fall within the scope and spirit of the following claims.

What is claimed is:

1. A double deck passenger carrying vehicle including side walls and a lower deck extending between the side walls on substantially a single level, a lower deck aisle space paralleling and adjacent to one side wall, a storage space having at least a part thereof located above the lower deck and extending substantially parallel to and adjacent the opposite side wall, and a series of lower deck seats mounted on the lower deck between the aisle space and storage space; said vehicle including also an upper deck joining the side walls and formed with a plurality of levels located at different heights above the lower deck, the lowermost level of said upper deck being positioned above the storage space and providing an upper level aisle space paralleling and adjacent said opposite side wall, and a series of upper deck seats mounted on one of the levels of the upper deck substantially above the series of lower deck seats.

2. A double deck passenger carrying vehicle including side walls and a lower deck extending between the side walls on substantially a single level, a lower deck aisle space paralleling and adjacent to one side wall, a storage space having at least a part thereof located above the lower deck and extending substantially parallel to and adjacent the opposite side wall, and a series of lower deck seats mounted on the lower deck between the aisle space and storage space; said vehicle including also an upper deck joining the side walls and formed with a plurality of levels located at different heights above the lower deck, the lowermost level of said upper deck being positioned above the storage space and providing an upper level aisle space paralleling and adjacent said opposite side wall, and a series of upper deck seats mounted on one of the levels of the upper deck substantially above the series of lower deck seats, said upper deck seats being located in spaced relation to said one side wall and overlapping a portion of said lower deck passageway.

3. A double deck passenger carrying vehicle including side walls and a lower deck extending between the side walls on substantially a single level, a lower deck aisle space paralleling and adjacent to one side wall, a storage space having at least a part thereof located above the lower deck and extending substantially parallel to and adjacent the opposite side wall, and a series of lower deck seats mounted on the lower deck between the aisle space and storage space; said vehicle including also an upper deck joining the side walls and formed with a plurality of levels located at different heights above the lower deck, the lowermost level of said upper deck being positioned above the storage space and providing an upper level aisle space paralleling and adjacent said opposite side wall, a series of upper deck seats mounted on one of the levels of the upper deck substantially above the series of lower deck seats, and means permitting entrance of passengers to either end of said upper deck passageway from the lower deck level.

4. A double deck passenger carrying vehicle including side walls and a lower deck extending between the side walls on substantially a single level, a series of lower deck seats mounted on said lower deck in spaced relation to the side walls, an upper deck joining said side walls and formed with a plurality of levels each located at a different height above the lower deck, a series of upper deck seats mounted on one of said levels in spaced relation to the side walls and substantially above said lower deck seats, and a passageway adjacent each side wall of the vehicle and each overlapping at least a portion of both the upper deck seats and the lower deck seats.

5. A double deck passenger carrying vehicle including side walls and a lower deck extending between the side walls on substantially a single level, a series of lower deck seats mounted on said lower deck in spaced relation to the side walls, an upper deck joining said side walls and formed with a plurality of levels each located at a different height above the lower deck, a series of upper deck seats mounted on one of said levels in spaced relation to the side walls and substantially above said lower deck seats, and a passageway adjacent each side wall of the vehicle and each overlapping at least a portion of both the upper deck seats and the lower deck seats, one of said passageways being located beneath said upper deck and the other being located above said upper deck with its floor formed by the lowermost level of the upper deck.

6. A double deck passenger carrying vehicle including side walls and a lower deck extending between the side walls on substantially a single level, a series of lower deck seats mounted on said lower deck in spaced relation to the side walls, an upper deck joining said side walls and formed with a plurality of levels each located at a different height above the lower deck, a series of upper deck seats mounted on one of said levels in spaced relation to the side walls and substantially above said lower deck seats, a first passageway adjacent one side wall of the vehicle and positioned beneath an upper level of said upper deck, a second passageway located adjacent the opposite side wall of the vehicle and above the upper deck with its floor formed by the lowermost level of the upper deck, and means located in the upper deck intermediate certain levels thereof for ventilating the space beneath the deck.

7. A double deck passenger carrying vehicle including side walls, upper and lower rows of windows in each side wall, a lower deck extending between the side walls on substantially a single level, a series of lower deck seats mounted on said lower deck in spaced relation to the side walls and with the tops thereof below the top edge of said lower rows of windows, an upper deck connected to one side wall substantially at the lower edge of the lower row of windows in such wall and being connected to the opposite side wall substantially at the lower edge of the upper row of windows in such opposite wall, and a series of upper deck seats mounted on said upper deck substantially above said lower deck seats and with their tops below the top edge of said upper rows of windows.

8. A double deck passenger carrying vehicle including side walls, upper and lower rows of windows in each side wall, a lower deck extending between the side walls on substantially a single level, a series of lower deck seats mounted on said lower deck in spaced relation to the side walls and with the tops thereof below the top edge of said lower rows of windows, an upper deck connected to one side wall substantially at the lower edge of the lower row of windows in such wall and being connected to the opposite side wall substantially at the lower edge of the upper row of windows in such opposite wall, and a series of upper deck seats mounted on said upper deck substantially above said lower deck seats and with their tops below the top edge of said upper rows of windows, said upper deck being formed with portions thereof removed to provide openings substantially in alignment with said lower rows of windows.

9. A double deck passenger carrying vehicle including side walls, upper and lower rows of windows in each side wall, a lower deck extending between the side walls on substantially a single level, a series of lower deck seats mounted on said lower deck in spaced relation to the side walls and with the tops thereof below the top edge of said lower rows of windows, an upper deck connected to one side wall substantially at the lower edge of the lower row of windows in such wall and being connected to the opposite side wall substantially at the lower edge of the upper row of windows in such opposite wall, said upper deck being formed with a plurality of levels located at different heights above the lower deck, a series of upper deck seats mounted on one of the levels of said upper deck and with their tops below the top ege of said upper rows of windows, and openings in said upper deck intermediate certain levels thereof and located substantially in horizontal alignment with said lower rows of windows.

ERIC RAMSTRUM.